United States Patent
Yamamoto

(10) Patent No.: US 7,123,342 B2
(45) Date of Patent: Oct. 17, 2006

(54) IMAGE FORMING APPARATUS INCLUDING A CONTROLLER FOR CONTROLLING AN EXPOSURE OF A PHOTOSENSITIVE MEMBER FOR MINIMIZING THE DIFFERENCE IN TONE BETWEEN AREAS ON THE PHOTOSENSITIVE MEMBER

(75) Inventor: Takuya Yamamoto, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 141 days.

(21) Appl. No.: 10/936,822

(22) Filed: Sep. 9, 2004

(65) Prior Publication Data

US 2005/0062946 A1 Mar. 24, 2005

(30) Foreign Application Priority Data

Sep. 9, 2003 (JP) ............................. 2003-316246

(51) Int. Cl.
G03B 27/52 (2006.01)
G03B 27/32 (2006.01)
(52) U.S. Cl. .......................................... 355/27; 355/40
(58) Field of Classification Search ................. 355/27, 355/46
See application file for complete search history.

(56) References Cited

FOREIGN PATENT DOCUMENTS

JP 2003-19825 A 1/2003

Primary Examiner—Peter B. Kim
Assistant Examiner—Marissa A. Ohira
(74) Attorney, Agent, or Firm—Smith Patent Office

(57) ABSTRACT

An image forming apparatus comprises an exposure department for exposing photographic paper conveyed at a first conveying speed, a development department for developing the photographic paper, conveyed at a second conveying speed lower than the first conveying speed, after being exposed in the exposure department. In the image forming apparatus, the relationship between 1) the distance along the conveying direction from a reference area to a micro area being the target of exposure correction, both the reference area and the micro area being on the photographic paper, and 2) the difference in tone between images formed at the reference area and the micro area when the reference area and the micro area are exposed to the same amount of light in the exposure department, and the relationship between the exposure of the photographic paper and the tone of the image at the reference area are stored.

9 Claims, 12 Drawing Sheets

IMAGE FORMING APPARATUS INCLUDING A CONTROLLER FOR CONTROLLING AN EXPOSURE OF A PHOTOSENSITIVE MEMBER FOR MINIMIZING THE DIFFERENCE IN TONE BETWEEN AREAS ON THE PHOTOSENSITIVE MEMBER

BACKGROUND OF THE INVENTION

1. Field of the Invention

The present invention relates to an image forming apparatus for applying an exposure process and a development process to a photosensitive member.

2. Description of the Related Art

A photograph processing apparatus is known, that can automatically apply processes such as exposure, development, bleaching and fixing and stabilization to photographic paper being a photosensitive member. In a photographic processing apparatus described in the Japanese Patent Application Laid-Open Publication No. 2003-019825, a sheet of photographic paper is exposed in an exposure department at an intensity according to the pixel level of each pixel in image data. Then, a latent image formed on the sheet appears when the sheet on which the latent image has been formed is developed in a development department.

In such a photograph processing apparatus, the processing capacity of the development department is generally smaller than the processing capacity of the exposure department. Therefore, the speed for conveying sheets of photographic paper in the development department is required to be lower than the speed for conveying the sheets of photographic paper in the exposure department. As above, when conveying speed is different in the exposure department and the development department, the time period from the moment at which the exposure process is applied to the moment at which the development process is applied (hereinafter, referred to as "latent image time") is not same between areas for each of which the distance from the front end in the conveying direction on a sheet of photographic paper is different from each other. More specifically, the latent image time of an image formed in an area in the vicinity of the back end of a sheet of photographic paper is longer than the latent image time of an image formed in an area in the vicinity of the front end of the sheet. The difference in the latent image time appears as the difference of the tone of the images obtained by developing. In other words, the tones in areas having the latent image time different from each other are not same even when the whole area of the sheet of photographic paper has been exposed according to the same pixel level. As a result, the images obtained have a low tone-reproducing property and low image quality. Especially, because the difference in the latent image time between the vicinity of the front end and the back end of the sheet of photographic paper is drastically large when the sheet of photographic paper is exposed over a very long range along the conveying direction, the image quality is considerably degraded.

SUMMARY OF THE INVENTION

The object of the present invention is to provide an image forming apparatus capable of forming high-quality images even when the difference in the latent image time is present on a photosensitive member.

According to an aspect of the present invention there is provided an image forming apparatus comprising: an exposure department for exposing a photosensitive member conveyed at a first conveying speed; a development department for developing the photosensitive member, conveyed at a second conveying speed different from the first conveying speed, after being exposed in the exposure department; and a controller for controlling the exposure of the photosensitive member in the exposure department such that, when two pixel levels in image data corresponding to a first area and a second area on the photosensitive member are identical, the positions along the conveying direction of the first area and the second area being different from each other, the difference in tone, caused by the difference in latent image time between the first area and the second area, between images formed respectively at the first area and the second area is smaller than that in the case where the first area and the second area are exposed to the same amount of light.

According to another aspect of the present invention there is provided an image forming apparatus comprising: an exposure department for exposing a photosensitive member conveyed at a first conveying speed; a development department for developing the photosensitive member, conveyed at a second conveying speed after being exposed in the exposure department; a tone difference characteristics storage that stores the relationship between the distance along the conveying direction from a reference area to a micro area being a target of exposure correction, both the reference area and the micro area being on the photosensitive member, and the difference in tone between images formed respectively at the reference area and the micro area when the reference area and the micro area are exposed to the same amount of light in the exposure department; a coloring characteristic storage that stores the relationship between the exposure of the photosensitive member and the tone of the image at the reference area; and an exposure derivation unit that derives an exposure of the micro area in the exposure department based on the relationship between the exposure and the tone stored in the coloring characteristic storage and the relationship between the distance and the difference in tone stored in the tone difference characteristics storage such that images with the same tone are formed at the micro area and the reference area when it is assumed that the pixel level of the reference area is same as that of the micro area.

According to still another aspect of the present invention there is provided an image forming apparatus comprising: an exposure department for exposing a first and a second photosensitive members conveyed in series at a first conveying speed; a development department for developing the first and the second photosensitive members, conveyed in parallel at a second conveying speed after being exposed in the exposure department; a first tone difference characteristics storage that stores a relationship between 1) the distance along the conveying direction from a reference area to a first micro area being the target of exposure correction, both the reference area and the first micro area being on the first photosensitive member, and 2) the difference in tone between images formed respectively at the reference area and the first micro area when the reference area and the first micro area are exposed to the same amount of light in the exposure department; a second tone difference characteristics storage that stores a relationship between 3) the distance along the conveying direction from a second micro area to a third micro area, both the micro area and the third micro area being on the second photosensitive member, and 4) the difference in tone between images formed respectively at the reference area, the second micro area and the third micro area when the reference area, the second micro area and the third micro area are exposed to the same amount of light in the exposure department; a coloring characteristic storage that stores the relationship between the exposure of the photosensitive member and the tone of the image at the reference area; and an exposure derivation unit that derives an exposures of the first through third micro areas in the exposure department based on the relationship between the exposure and the tone stored in the coloring characteristic storage and the relationship between the distance and the difference in tone stored in the first and the second tone difference characteristics storages such that images with the same tone are formed at the first through third micro areas and the reference area when it is assumed that the pixel level of the reference area is same as that of the first through third micro areas.

BRIEF DESCRIPTION OF THE DRAWINGS

Other and further objects, aspects, features and advantages of the present invention will appear more fully from the following description when taken in connection with the accompanying drawings, in which.

DESCRIPTION OF THE PREFERRED EMBODIMENTS

Figure 1:
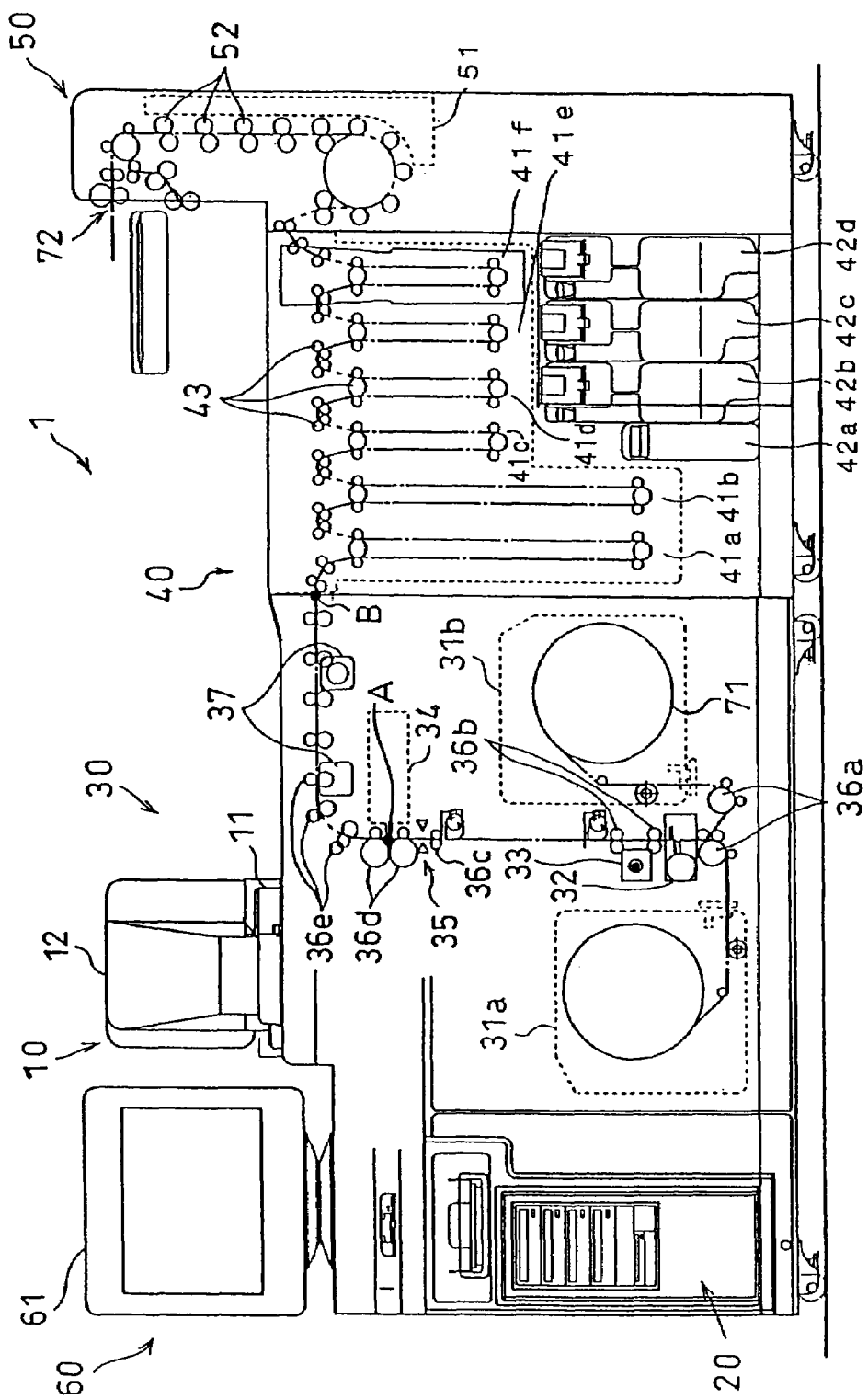
FIG. 1 shows a schematic structure of a photograph processing apparatus according to a first embodiment of the present invention.

FIG. 1 shows a schematic structure of a photograph processing apparatus according to a first embodiment of the present invention. As shown in FIG. 1, a photograph processing apparatus 1 of the embodiment has a scanner department 10, a control department 20, an exposure department 30, a development department 40, a finishing process department 50 and an interface department 60.

In the scanner department 10, a photographic film attached to a film attaching unit 11 is illuminated by a light beam from a light source accommodated in a light source unit 12. Then, the light beam having passed through the photographic film is imaged on an image pickup device such as a CCD line image sensor arranged under the film attaching unit 11. Thereby, an image recorded in each frame of the photographic film is read by the image pickup device. Image data outputted from the image pickup device is converted into a digital signal by an A/D converter (not shown) and, thereafter, is supplied to the control department 20.

The control department 20 comprises, for example, a multi-purpose personal computer. The control department 20 applies image processing to image data read by the scanner department 10 and controls the whole photograph processing apparatus 1. The control department 20 contains a storage device such as a hard disk and the storage device stores various software programs including a program dedicated to the photograph processing apparatus 1 of the embodiment in addition to a multi-purpose operating system.

In the exposure department 30, an exposure process is applied to a sheet of photographic paper 71 being the photosensitive member. Thereby, a latent image is formed on the sheet of photographic paper 71. The exposure department 30 has a plurality of conveying roller pairs 36a to 36e to convey the sheet of photographic paper 71 and a motor 37 to drive the conveying roller pairs 36a to 36e. In the exposure department 30, two paper magazines 31a and 31b are arranged, that each accommodates a long sheet of photographic paper 71 that is rolled. The sheets of photographic paper 71 rolled out from the paper magazines 31a and 31b are cut along the lateral direction by a cutter 32 in lengths corresponding to the print sizes.

On the face on which the photosensitive emulsion layer is not formed, the back face of a sheet of photographic paper after being cut, desired items such as the date of printing and an order number can be printed by a letter printing unit 33. The exposure unit 34 performs scanning exposure to the sheets of photographic paper using a laser beam emitted from a laser light sources respectively corresponding to the three colors of blue, green and red. A sensor 35 arranged upstream of exposure positions detects the front ends of the sheets of photographic paper 71 in the conveying direction.

In the development department 40, processes such as development, bleaching and fixing and stabilization are applied to the sheets of photographic paper 71 already exposed. Thereby, the latent images formed on the sheets of photographic paper 71 become apparent images. The development department 40 has processing tanks 41a to 41f to apply processes of development, bleaching and fixing and stabilization to the sheet of photographic paper 71 supplied from the exposure department 30, tanks 42a to 42d for wasted solutions and refilling solutions of processing solutions stored in the processing tanks 41a to 41f, a plurality of roller pairs 43 to convey the sheets of photographic paper 71 and a motor (not shown) to drive the roller pairs 43.

In the finishing process department 50, a drying process is applied to the sheets of photographic paper 71 on which the images has become apparent and which have been discharged from the development department 40, and the sheets of photographic paper 71 discharged from an outlet 72 are classified for the order of each customer. The finishing process department 50 has a heater 51 to rapidly dry the sheets of photographic paper 71 discharged from the development department 40, a plurality of roller pairs 52 to convey the sheets of photographic paper 71 and a motor (not shown) to drive the roller pairs 52. After being conveyed by the roller pairs 52, the sheets of photographic paper 71 are discharged from the outlet 72 as finished prints.

The interface department 60 has a display 61 to inform an operator of various information relating to the photograph processing apparatus 1 by displaying the information, a keyboard 62 (see FIG. 8) for the operator to give directions for control and the image processing to the photograph processing apparatus 1.

Figure 2:
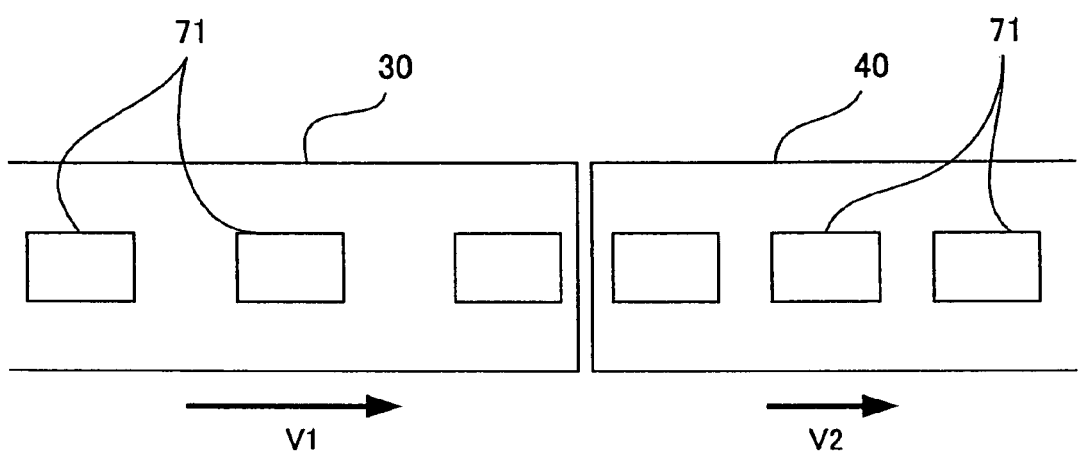
FIG. 2 is a schematic diagram showing the view of conveying sheets of photographic paper in an exposure department and a development department of the photograph processing apparatus shown in FIG. 1.

How the plurality of sheets of photographic paper are conveyed in the exposure department 30 and the development department 40 will be described referring to FIG. 2. FIG. 2 is a schematic diagram showing the view of conveying of a plurality of sheets of photographic paper in the exposure department and the development department such that each of the sheets is in a line. The arrows in the figure indicate the direction in which the sheets of photographic paper are conveyed.

In the photograph processing apparatus 1, a conveying speed V1 conveying the sheets of photographic paper 71 in the exposure department 30 is relatively high and, whereas, a conveying speed V2 conveying the sheets of photographic paper 71 in the development department 40 is relatively low due to the difference in the processing capacity between the exposure department 30 and the development department 40. That is, a relationship as shown in the following Eq. 1 is established between the conveying speed V1 conveying the sheets of photographic paper 71 in the exposure department 30 and the conveying speed V2 conveying the sheets of photographic paper 71 in the development department 40.

$$V1>V2 \quad \text{Eq. 1}$$

Figure 3:
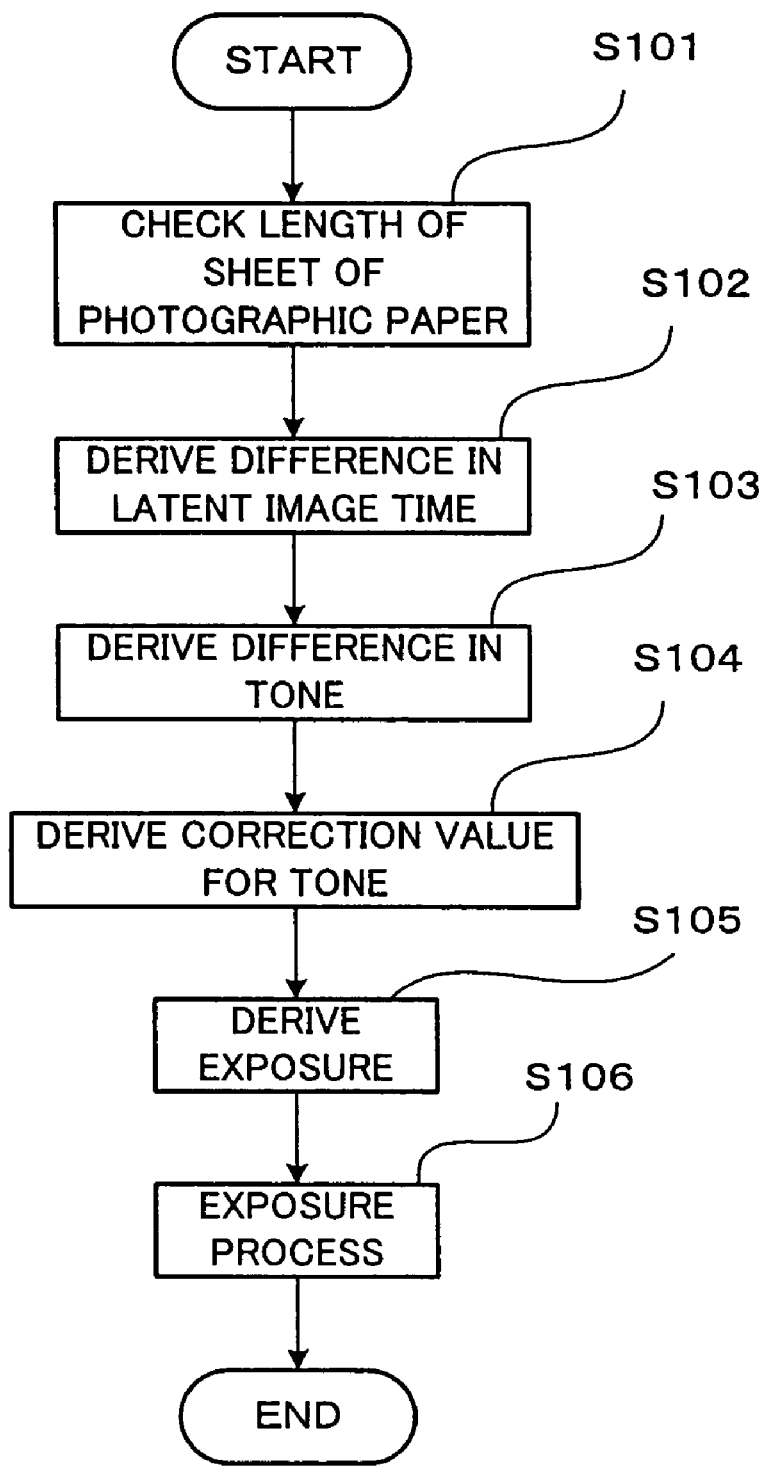
FIG. 3 is a flowchart for illustrating the principle of an exposure process in the photograph processing apparatus shown in FIG. 1.

Next, the principle of the exposure process in the photograph processing apparatus according to the embodiment will be described according to a flowchart shown in FIG. 3. The flowchart shown in FIG. 3 is presented only for describing the principle of the exposure process and each of the steps in the flowchart is not necessarily carried out actually in the photograph processing apparatus 1.

Figure 4:
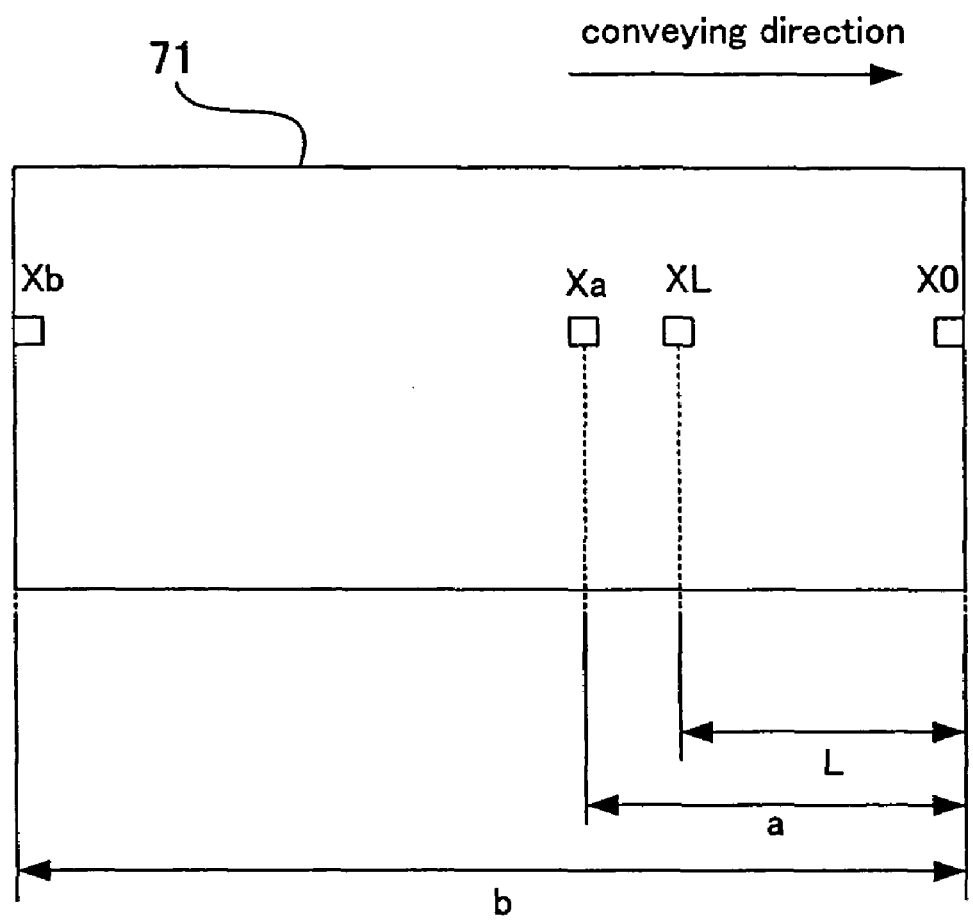
FIG. 4 is a diagram showing the relationship of positions of micro areas located on a sheet of photographic paper in the first embodiment of the present invention.

First, at Step 101, the length of the sheet of photographic paper 71 on which an image will be formed is checked. The length of the sheet of photographic paper 71 differs in response to what size of image will be printed on the paper. Therefore, this check of the length of the sheet of photographic paper 71 is performed based on data relating to the image size to be printed. As an example, a sheet of photographic paper 71 having a length of b in the conveying direction is shown in FIG. 4 and one image is formed in the whole area of the sheet of photographic paper 71 depicted in FIG. 4. In FIG. 4, on the sheet of photographic paper 71, three micro areas X0, Xa and Xb are depicted along the conveying direction located in the center in the lateral direction of the sheet of photographic paper. The micro area X0 is present at the front end in the conveying direction (hereinafter, simply referred to as "front end") of the sheet of photographic paper and the micro area Xb is located at the back end on the sheet. As an example, each of the micro areas X0, Xa and Xb may have a size corresponding approximately to the size of one dot on the sheet of photographic paper 71. The distances along the conveying direction from the front end to these three micro areas X0, Xa and Xb are respectively 0, a and b. In the following description, an arbitrary micro area at a position between the two micro areas X0 and Xb is denoted by XL and the distance along the conveying direction from the front end to the micro area XL is denoted by L, also in FIG. 11. The description will be presented taking an example of the micro areas along the conveying direction located in the center in the lateral direction of the sheet of photographic paper 71. This description is consistent regardless of the positions of the micro areas in the direction along the width of the sheet of photographic paper 71.

Then, at Step 102, the difference between the latent image time at the micro area XL and the latent image time at the micro area X0 is derived based on the distance L along the conveying direction from the front end to the micro area XL. Here, a latent image time T0 at the micro area X0 can be represented as the following Eq. 2 where the distance between an exposure position A and a development starting position B shown in FIG. 1 is L1 and the conveying speed of the sheet of photographic paper 71 in the exposure department 30 is V1.

$$T0=L1/V1 \quad \text{Eq. 2}$$

On the other hand, a latent image time TL at the micro area XL can be represented as the following Eq. 3 where the conveying speed of the sheet of photographic paper in the development department 40 is V2 (V1>V2).

$$TL=\{(L1-L)/V1\}+L/V2 \quad \text{Eq. 3}$$

Therefore, the difference DTL in the latent image time between the micro area XL and the micro area X0 can be derived from the following Eq. 4. Based on Eq. 4, the difference DTa between the latent image time at the micro area Xa and the latent image time at the micro area X0, and the difference DTb between the latent image time at the micro area Xb and the latent image time at the micro area X0 can be respectively derived.

$$DTL=TL-T0=L(V1-V2)/V1\cdot V2 \quad \text{Eq. 4}$$

Figure 5:
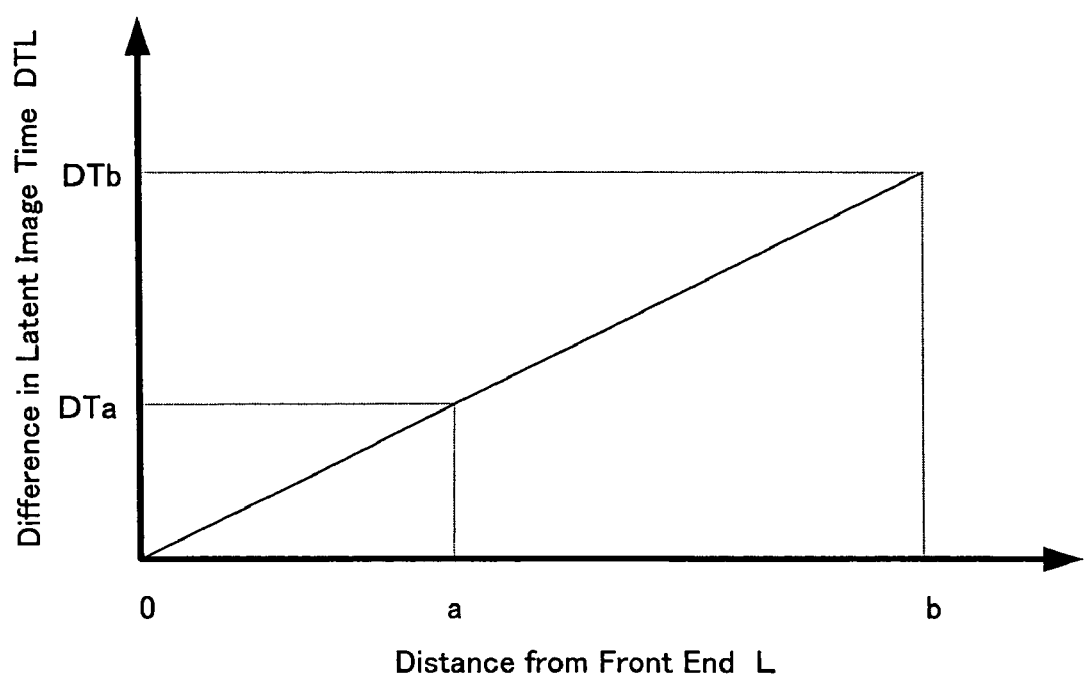
FIG. 5 is a graph showing the relationship between the distance from the front end of a sheet of photographic paper and the difference in the latent image time.

From Eq. 4, it can be seen that the latent image time is not same at the micro area X0 and at the micro area XL and that there is a proportionality relation shown in FIG. 5 between the distance L from the front end to the micro area XL and the difference DTL in the latent image time between the micro area X0 and the micro area XL when the conveying speed V1 for the sheet of photographic paper 71 in the exposure department 30 is higher than the conveying speed V2 for the sheet of photographic paper 71 in the development department 40.

At Step 103, based on the difference DTL in the latent image time derived at Step 102, the difference NL in tone between an image formed at the micro area X0 and an image formed at the micro area XL is derived for the case where the micro area X0 and the micro area XL are exposed to the same amount of light.

Figure 6:
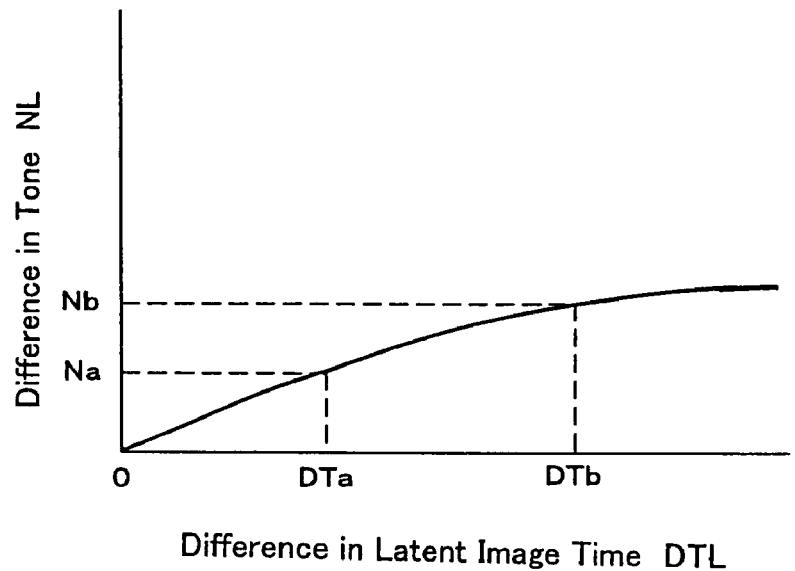
FIG. 6 is a graph showing the relationship between the latent image time and the difference in tone.

FIG. 6 shows the relationship between the difference in the latent image time between the micro area X0 and the micro area XL, and the difference in tone between an image formed at the micro area X0 and an image formed at the micro area XL for the case where the micro area X0 and the micro area XL are exposed to the same amount of light. From FIG. 6, it can be seen that the difference in tone becomes larger as the latent image time becomes longer.

Here, because the latent image time and the tone of an image formed at the micro area X0 at the front end of the sheet of the photographic paper 71 are used as the criterion, the difference in the latent image time and the difference in tone are both zero for the micro area X0. Therefore, based on FIG. 6, the differences in tones Na and Nb can be derived between the image formed at the micro area X0 at the front end of the sheet of photographic paper 71 and the images formed at the micro areas Xa and Xb (the differences in the latent image time from the micro area X0 are DTa and DTb) that are apart the distance a and b from the front end.

Next, at Step 104, based on the difference NL in tone derived at Step 103, a correction value ML of the coloring is derived for the image formed at the micro area XL. Table 1 is a correction table indicating the relationship between the distance L from the front end of the sheet of photographic paper 71 and the correction value ML of the tone for the image formed at the micro area XL. The correction value ML of the tone shown in Table 1 is the value relative to the tone of the image formed at the micro area X0. Therefore, a correction value M0 for the image formed at the micro area X0 is zero.

TABLE 1

| Distance L from the Front End | Correction Value ML |
|---|---|
| 0 | M0 (= 0) |
| . | . |
| . | . |
| . | . |
| a | Ma (= −Na) |
| . | . |
| . | . |
| . | . |
| b | Mb (= −Nb) |

The correction value ML of the tone for the image formed at the micro area XL is a value, with an opposite sign, of the difference NL in tone between the image formed at the micro area X0 and the image formed at the micro area XL, and the relationship of the following Eq. 5 is established.

$$ML = -NL \quad \text{Eq. 5}$$

In this manner, the correction values Ma and Mb of the tone for the images formed at the micro areas Xa and Xb can be derived from Table 1.

Figure 7:
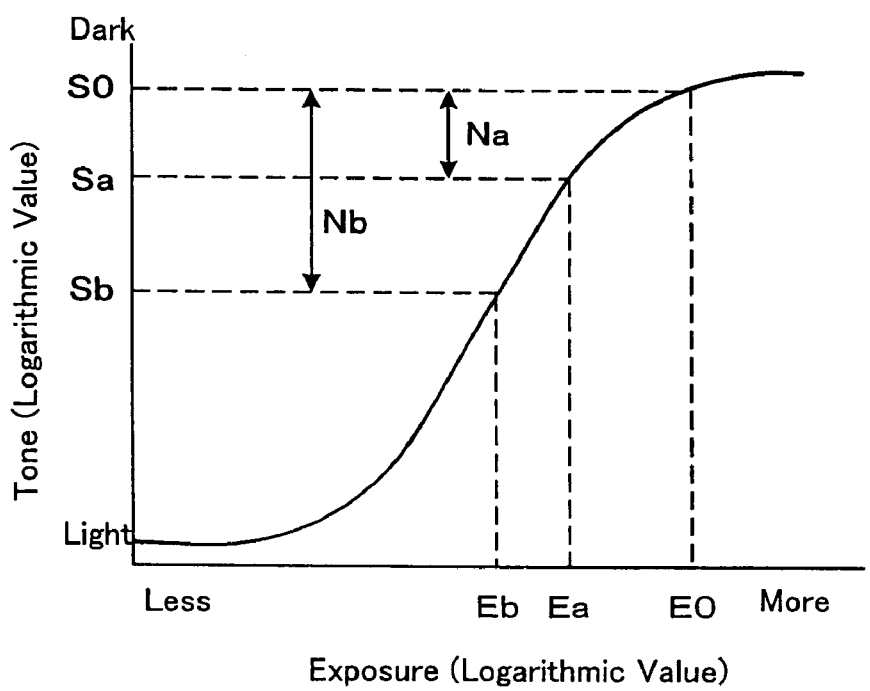
FIG. 7 is a graph showing the coloring characteristic in the first embodiment of the present invention.

Next, at Step 105, the exposure of the micro area XL is derived based on the correction value ML of the tone derived at Step 104 and the coloring characteristic of the sheet of photographic paper 71. FIG. 7 is a graph showing an example of the coloring characteristic of the sheet of photographic paper 71 when the latent image time is T0. In FIG. 7, the axis of abscissa represents the exposure and the axis of ordinate represents the tone.

Here, the case where, in image data, the pixel levels of the pixels corresponding to the micro areas X0, Xa and Xb are all correspond to the tone S0 will be considered. Without considering the difference in tone caused by the difference in the latent image time among the micro areas, these micro areas X0, Xa and Xb may be all exposed with the exposure E0. However, considering the difference in tone caused by the difference in the latent image time for the micro areas X0, Xa and Xb, the exposures of the micro areas X0, Xa and Xb need to be adjusted as follows.

Because the correction value of the tone for the image formed at the micro area X0 is derived as the correction value M0 from the correction table in Table 1, the exposure of the micro area X0 need to be adjusted from the exposure E0 to an exposure smaller than the exposure E0 by an exposure corresponding to the correction value M0. Here, because the correction value M0 is zero as seen from Table 1, the exposure of the micro area X0 does not need to be adjusted and the exposure of the micro area X0 is derived as E0.

Because the correction value of the tone for the image formed at the micro area Xa is derived as a correction value Ma from the correction table in Table 1, the exposure of the micro area Xa needs to be adjusted from the exposure E0 to an exposure smaller than the exposure E0 by an exposure corresponding to the correction value Ma. Here, because the correction value Ma is equal to −Na as can be seen from Eq. 5, the exposure of the micro area Xa is, as shown in FIG. 7, derived as "Ea" which corresponds to a tone Sa that is lighter than a tone S0 by the difference Na in tone. Similarly, the exposure of the micro area Xb is derived as Eb.

For facilitation of understanding of the description, the case where the pixel levels of the pixels corresponding to the micro areas X0, Xa and Xb in the image data has been described. However, the exposures of the micro areas X0, Xa and Xb can be respectively derived in the same manner for the case where the pixel levels of the three micro areas X0, Xa and Xb differ from each other. That is, the exposures of the micro areas Xa and Xb derived in this case are the exposures corresponding to tones that are lighter than the tones corresponding to the pixel levels of the pixels corresponding to the micro areas Xa and Xb by the correction values Ma and Mb.

Finally, at Step 106, the micro area XL on the sheet of photographic paper 71 is exposed with the exposure derived at Step 105. There is almost no difference in tone caused by the difference in latent image time among the images formed in each of the micro areas X0, Xa and Xb on the sheet of photographic paper 71 exposed in this manner.

As described above, in the case where the pixel levels of the pixels corresponding to the micro areas X0, Xa and Xb correspond to the tone S0, the micro areas X0, Xa and Xb on the sheet of photographic paper 71 are respectively exposed with the exposures E0, Ea and Eb. At the micro area X0, the development process is started when a latent image time T0 has passed since the exposure with the exposure E0 and, thereby, an image with the tone S0 is formed. At the micro area Xa, the development process is started at the time when a latent image time Ta that is longer than the latent image time T0 at the micro area X0 by a time period DTa has passed since the time when the micro area Xa was exposed with an exposure Ea and, thereby, an image with a tone S0 is formed. At the micro area Xb, the development process is started at the time when a latent image time Tb that is longer than the latent image time T0 at the micro area X0 by a time period DTb has passed since the time when the micro area Xb was exposed with an exposure Eb and, thereby, an image with a tone S0 is formed. By performing the adjustment of the exposures in this manner, images with the same tone S0 are formed at the micro areas X0, Xa and Xb that have the same pixel level of the image data even through the latent image times at the areas differ from each other.

Figure 8:
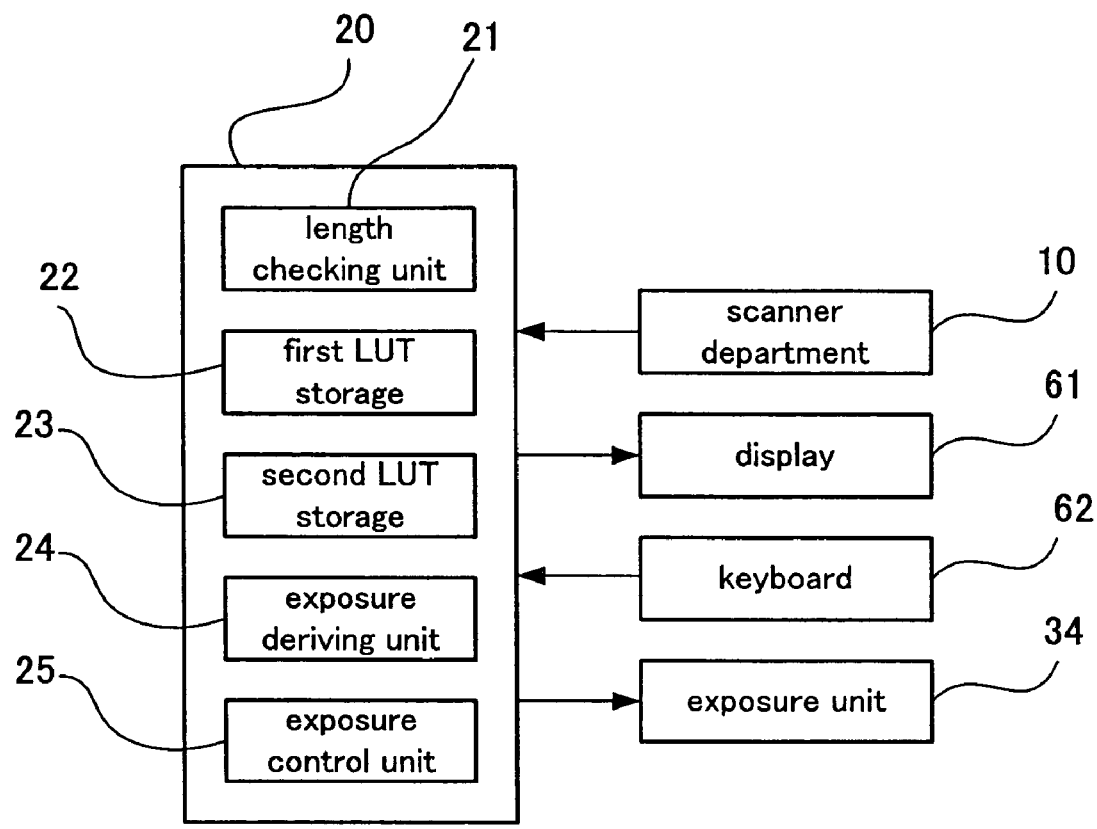
FIG. 8 is a block diagram of the photograph processing apparatus shown in FIG. 1.

Next, the control system of the photograph processing apparatus 1 will be described referring to FIG. 8 that is a block diagram of the photograph processing apparatus 1. As shown in FIG. 8, the control department 20 includes a length checking unit 21, a first LUT (Look Up Table) storage 22, a second LUT storage 23, an exposure deriving unit 24, and an exposure control unit 25. To the control department 20, the scanner department 10, the display 61, the keyboard 62 and the exposure unit 34 are connected. The control department 20 comprises hardware such as a CPU, a ROM and a RAM that are controlled by software.

The length checking unit 21 checks the length of the sheet of photographic paper to be exposed based on data relating to the image size to be printed on the sheet of photographic paper 71.

In the first LUT storage 22, three different correction tables for each of the laser light sources corresponding respectively to the three colors of blue, green and red, showing the relationship between the distance L from the front end of the sheet of photographic paper 71 and the correction value ML of the tone as shown in Table 1 are stored. The three correction tables stored in the first LUT storage 22 are re-written according to the conveying speed V1 for the sheet of photographic paper 71 in the exposure department 30, the conveying speed V2 for the sheet of photographic paper 71 in the development department 40, the characteristics of the developing solution used in the developing process and the characteristics of the sheet of photographic paper to be exposed.

In the second LUT storage 23, three different correction tables for each of the laser light sources corresponding respectively to the three colors of blue, green and red, showing the coloring characteristics (the relationship between the exposure and the tone) of the sheet of photographic paper 71 as shown in FIG. 7 are stored. The three correction tables stored in the second LUT storage 23 are re-written according to the characteristics of the sheet of photographic paper to be exposed.

The exposure deriving unit 24 derives the exposure in the exposure department 30 for each of the micro areas XL of the sheet of photographic paper 71, that have different distances from each other along the conveying direction from the front end and that are located within the range of length checked by the length checking unit 21, based on the correction tables stored in the first LUT storage 22 and the second LUT storage 23 such that an image with the same tone as the image at the micro area X0 is formed at the micro area XL assuming that the pixel level of the micro area X0 is same as the pixel level of the micro area XL. In this case, the pixel level of the pixel corresponding to each of the micro area XL is referred to in the image data. The calculation performed by the exposure deriving unit 24 is equal to the calculation described at Step 104 and Step 105 in FIG. 3. The items described at Step 102 and Step 103 are already incorporated at Step 104 and, therefore, the exposure deriving unit 24 does not perform these items.

The exposure control unit 25 controls the exposure unit 34 such that the micro area XL on the sheet of photographic paper 71 within the length range checked by the length checking unit 21 is exposed with the exposure derived by the exposure deriving unit 24.

As described above, according to the photograph processing apparatus 1 of the embodiment, a high-quality image can be formed without any tone non-uniformity caused by the difference in the latent image time between the micro area X0 located at the front end of the sheet of photographic paper and the micro area XL separated away from the micro area X0 in the conveying direction. Furthermore, rapid control is possible because the control department 20 has the first LUT storage 22 and the second LUT storage 23 storing the correction tables.

Next, a photograph processing apparatus according to a second embodiment of the present invention will be described.

Figure 9:
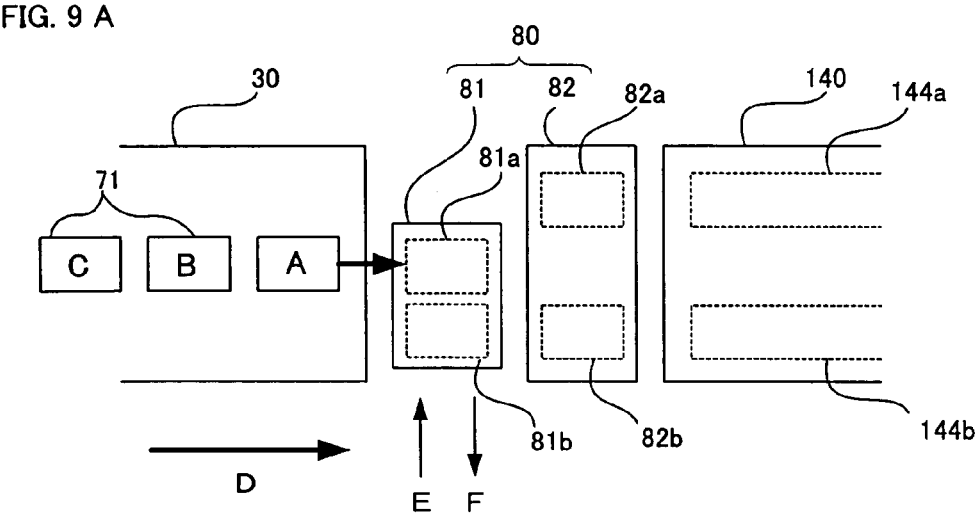
FIG. 9A, FIG. 9B and FIG. 9C illustrate the operation of a paper assignment department in a photograph processing apparatus according to the second embodiment of the present invention.
Figure 9:
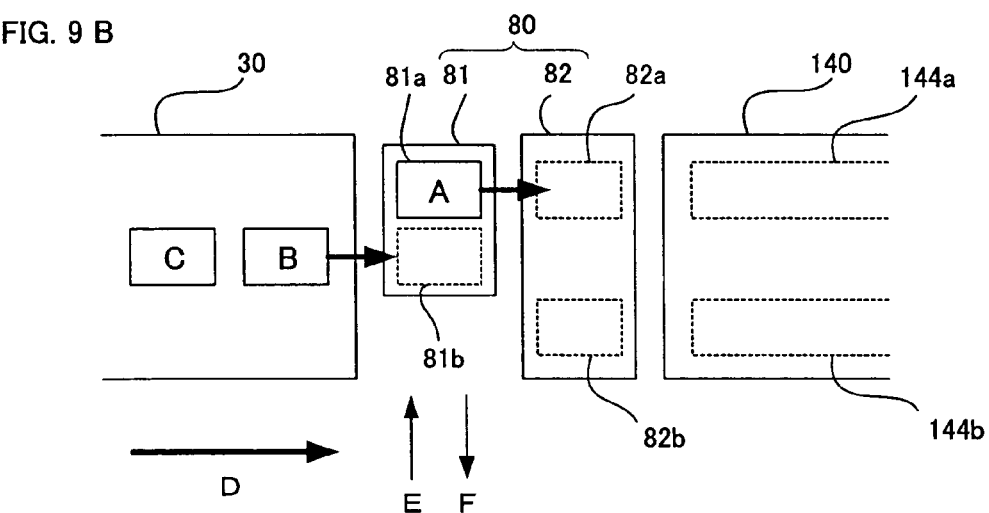
Figure 9:
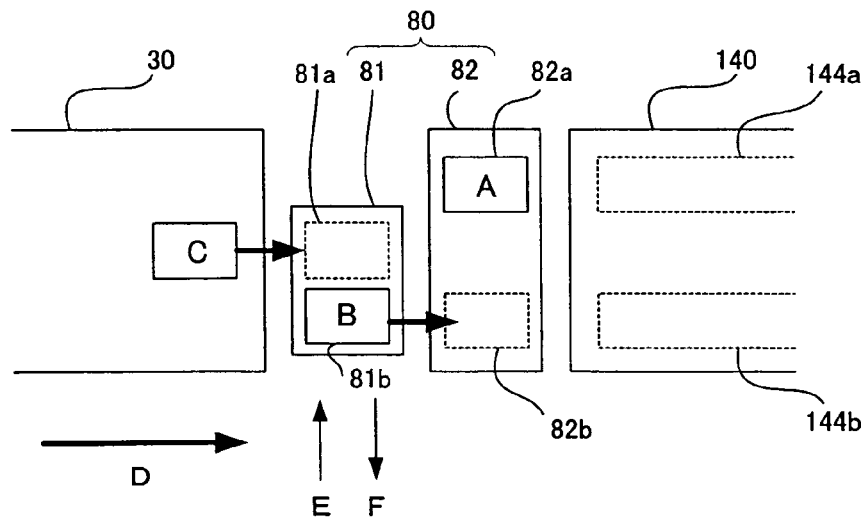

The major point for which the constitution of the photograph processing apparatus according to the embodiment is different from the constitution of the photograph processing apparatus 1 according to the first embodiment is that a plurality of sheets of photographic paper 71 are conveyed in a line in both of the exposure department 30 and the development department 40 in the photograph processing apparatus 1 shown in FIG. 1, whereas, in the photograph processing apparatus of the embodiment, as shown in FIG. 9A, FIG. 9B and FIG. 9C, a plurality of sheets of photographic paper 71 are conveyed in a line in the exposure department 30 and the plurality of sheets of photographic paper 71 are conveyed in two lines in parallel in a development department 140. Since the other portions of the structure are the same as that of the photograph processing apparatus 1 shown in FIG. 1, a specific description of this has been omitted.

In the photograph processing apparatus of the embodiment, a paper assignment department 80 is arranged between the exposure department 30 and the development department 140. Two conveying paths (a first conveying path 144a and a second conveying path 144b) are provided in the development department 140 in order to convey the sheet of photographic paper 71 applied with an exposure process in the exposure department 30 in two lines.

The paper assignment department 80 has a paper assignment unit 81 and a paper sending unit 82. The paper assignment unit 81 receives the sheets of photographic paper 71 provided from the exposure department 30 and provides the sheets to the paper sending unit 82. The paper assignment unit 81 is provided with a first hand-over section 81a and a second hand-over section 81b. The paper assignment unit 81 can be moved back and force in a direction (the direction indicated by the arrow E and the arrow F) perpendicular to the direction in which the sheets of photographic paper 71 is conveyed.

The paper sending unit 82 provides the sheets of photographic paper 71 received from the paper assignment unit 81 to the development department 140. The paper sending unit 82 is provided with a first sending section 82a and a second sending section 82b. The first sending section 82a send out the sheets of photographic paper 71 to the first conveying path 144a of the development department 140 and the second sending section 82b sends out the sheets of photographic paper 71 to the second conveying path 144b of the development department 140.

The operation in which the sheets of photographic paper 71 are assigned in the paper assignment department 80 will be described. In FIG. 9A, FIG. 9B and FIG. 9C, alphabetical references A, B and C are given to three sheets of photographic paper 71 from the one at the head conveyed one after another in the exposure department 30. The arrow D in the figure indicates the direction in which the sheets of photographic paper 71 are conveyed.

As shown in FIG. 9A, immediately before the sheet A of photographic paper 71 reaches the paper assignment department 80, the paper assignment unit 81 moves in the direction indicated by the arrow F such that the first hand-over section 81a is arranged in a position on the extension line of the conveying path for the sheets of photographic paper 71 in the exposure department 30. Then, the sheet A of photographic paper is sent from the exposure department 30 to the first hand-over section 81a.

Following the above, the paper assignment unit 81 in which the sheet A of photographic paper is loaded on the first hand-over section 81a moves in the direction indicated by the arrow E as shown in FIG. 9B. Then, the first hand-over section 81a is arranged in the extension line of the first sending section 82a and the first conveying path 144a in the development department 140 as well as the second hand-over section 81b is arranged in the extension line of the conveying path for the sheet of photographic paper 71 in the exposure department 30. Then, the sheet A of photographic paper is sent from the first hand-over section 81a to the first sending section 82a as well as the sheet B of photographic paper is sent from the exposure department 30 to the second hand-over section 81b.

Thereafter, as shown in FIG. 9C, the paper assignment unit 81 in which the sheet B of photographic paper is loaded on the second hand-over section 81b moves again in the direction indicated by the arrow E. Then, the second hand-over section 81b is arranged in the extension line of the first sending section 82a and the second conveying path 144b in the development department 140 as well as the first hand-over section 81a is arranged in the extension line of the conveying path for the photographic paper 71 in the exposure department 30. Then, the sheet B of photographic paper is sent from the second hand-over section 81b to the second sending section 82b as well as the sheet C of photographic paper is sent from the exposure department 30 to the first hand-over section 81a. At this moment, the sheet A of photographic paper is stopped being arranged in the first sending section 82a of the paper sending unit 82.

Then, in the paper sending unit 82, the sheet A of photographic paper arranged in the first sending section 82a and the sheet B arranged in the second sending section 82b are supplied at the same time to the first conveying path 144a and the second conveying path 144b respectively in the development department 140.

In this manner, in the photograph processing apparatus of the embodiment, the sheets of photographic paper 71 having been applied with the exposure process at odd-numbered turns in the order from the first one (A, C, . . . ) are left stopped temporarily on the paper sending unit 82 until the respective next sheets of photographic paper (the sheets of photographic paper having been applied with the exposure process at even-numbered turns) are sent to the paper sending unit 82. Therefore, considering the micro areas at the same distance from the front end, the latent image time at the micro areas on the sheets of photographic paper 71 having been applied with the exposure process at odd-numbered turns is longer than the latent image time at the micro areas on the sheets of photographic paper 71 having been applied with the exposure process at even-numbered turns be a waiting time Ts in the paper sending unit 82.

Thus, there are relationships represented by the following Eq. 5, Eq. 6 and Eq. 7 between latent image times T0', Ta' and Tb' of images formed in a micro area X0' located at the front end of a sheet of photographic paper 71 having been applied with the exposure process at an even-numbered turn and in micro areas Xa' and Xb' (see FIG. 11) separated away from the front end by distances respectively a and b, and latent image times T0'', Ta'' and Tb'' of images formed in a micro area X0'' located at the front end of a sheet of photographic paper 71 having been applied with the exposure process at an odd-numbered turn and in micro areas Xa'' and Xb'' (see FIG. 11) separated away from the front end by distances respectively a and b.

$$T0''=T0'+Ts \qquad \text{Eq. 6}$$

$$Ta''=Ta'+Ts \qquad \text{Eq. 7}$$

$$Tb''=Tb'+Ts \qquad \text{Eq. 8}$$

Figure 10:
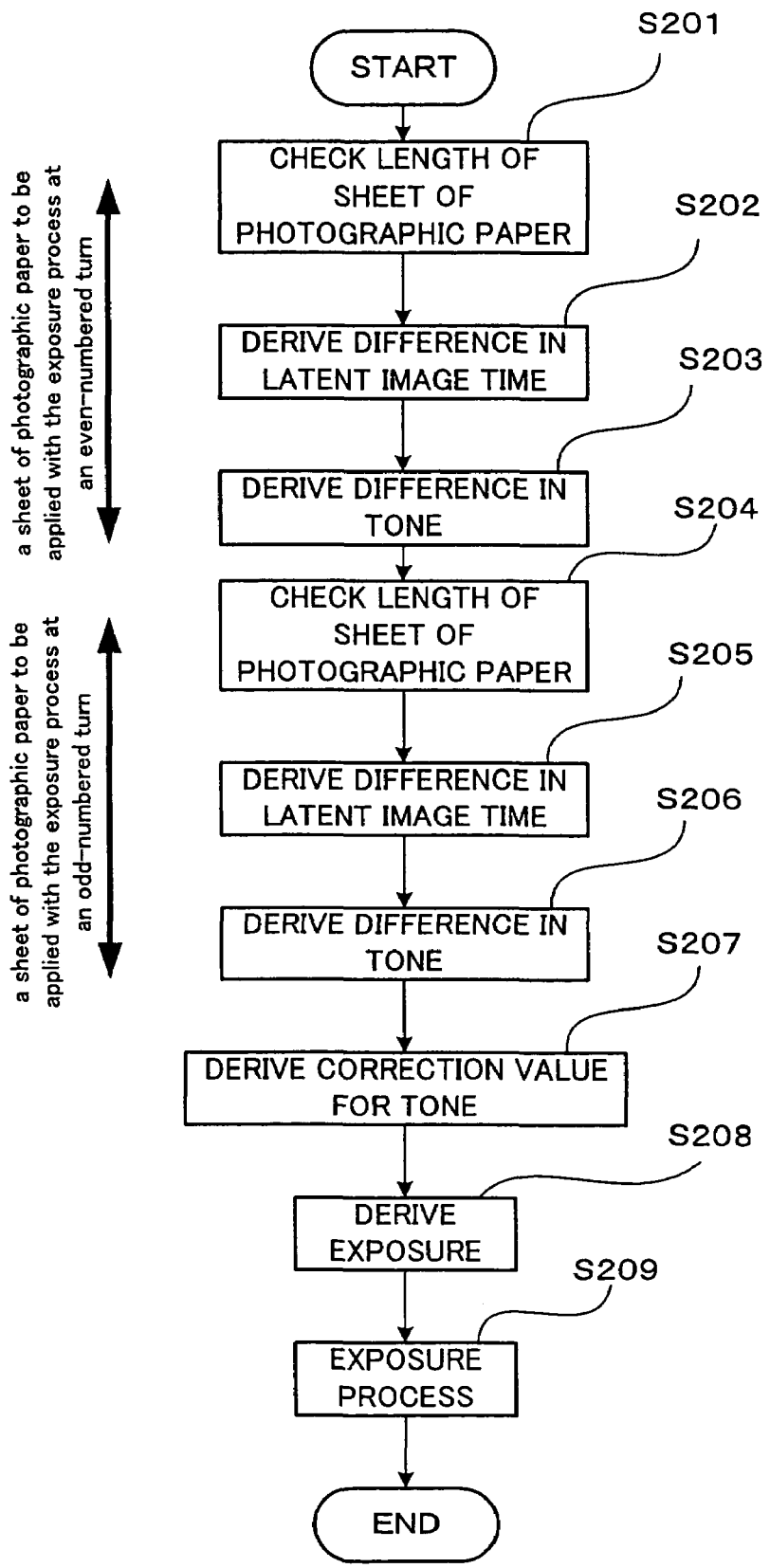
FIG. 10 is a flowchart for illustrating the principle of an exposure process in the photograph processing apparatus according to the second embodiment of the present invention.

Next, the principle of the exposure process in the photograph processing apparatus according to the embodiment will be described following a flowchart shown in FIG. 10. The flowchart shown in FIG. 10 is presented only for describing the principle of the exposure process and each of the steps in the flowchart is not necessarily carried out actually in the photograph processing apparatus.

First, at Step 201, the length of sheets of photographic paper 71 to be applied with the exposure process at even-numbered turns in the exposure department 30 is checked. The length of the sheets of photographic paper 71 differs according to what size of image is to be printed. Therefore, the check of the length of the sheets of photographic paper 71 is carried out based on data relating to the image sizes to be printed.

Figure 11:
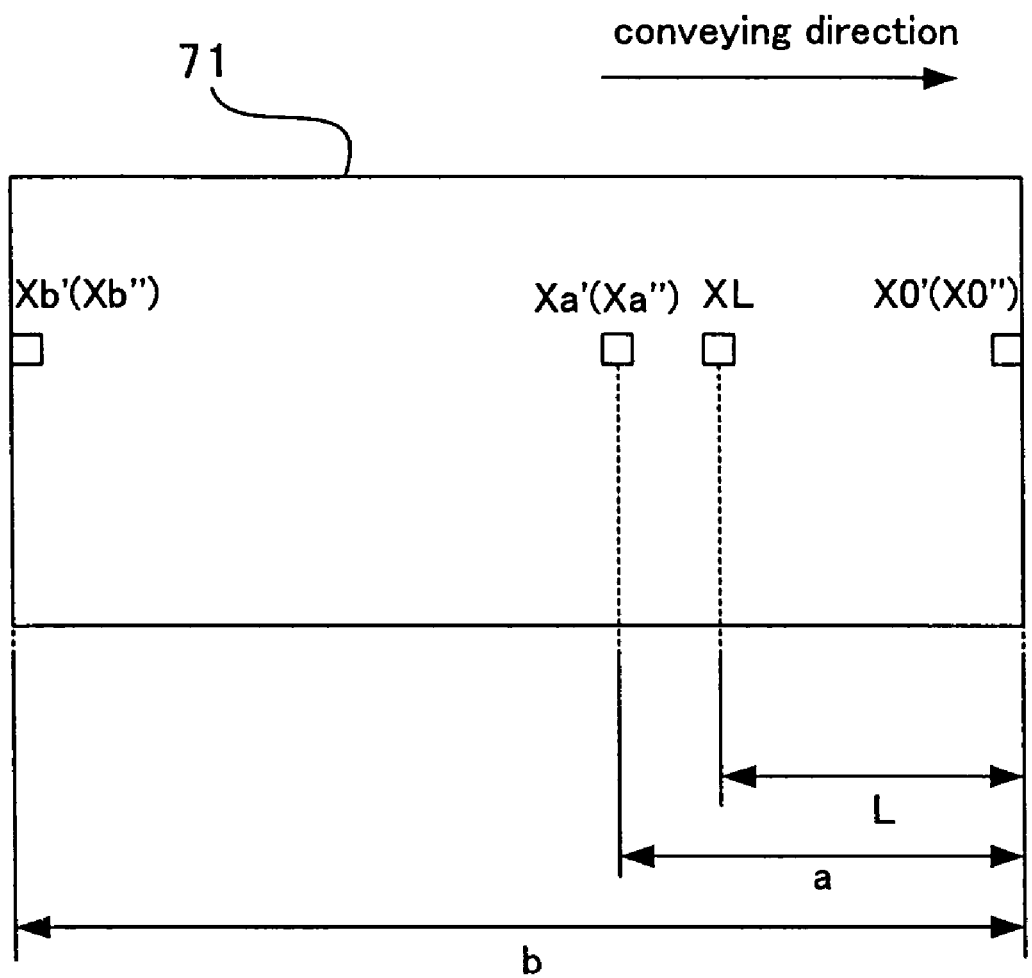
FIG. 11 is a diagram showing the relationship of the positions of micro areas located on a sheet of photographic paper in the second embodiment of the present invention.

In FIG. 11, as an example, a sheet of photographic paper 71 having a length b in the conveying direction and one image is formed over the whole area of the sheet of photographic paper 71 depicted in FIG. 11. In FIG. 11, on the sheet of photographic paper 71, similar to the three micro areas X0, Xa and Xb described in the first embodiment, three micro areas X0', Xa' and Xb' are depicted along the conveying direction in the central position in the width direction of the sheet of photographic paper.

Next, at Step 202, based on the distance L along the conveying direction from the front end to the micro area XL on the sheet of photographic paper 71 to be applied with the exposure process at an even-numbered turn, the difference between the latent image time at the micro area XL and the latent image time at the micro area X0' is derived.

Figure 12:
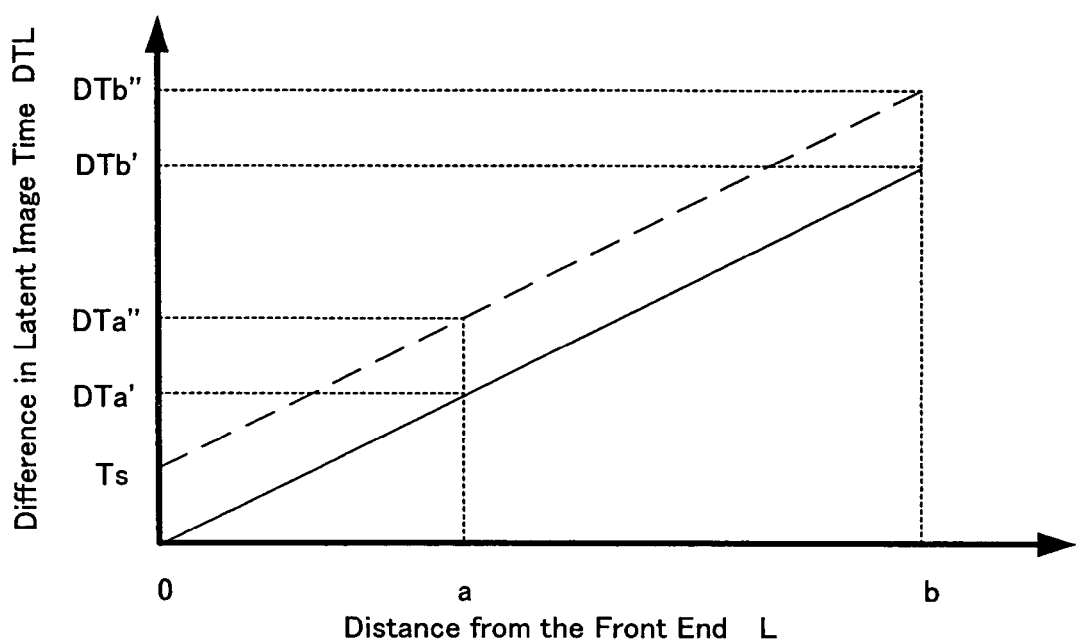
FIG. 12 is a graph showing the relationship between the distance from the front end of the sheet of photographic paper and the difference in the latent image time in the second embodiment of the present invention.

Here, for the sheet of photographic paper 71 to be applied with the exposure process at an even-numbered turn, similarly to the first embodiment, there is a proportional relationship represented by the solid line in FIG. 12 between the distance L from the front end of the sheet of photographic paper 71, and the difference DTL in the latent image time between the micro area X0' on the sheet of photographic paper 71 and the micro area XL on the sheet of photographic paper 71. Therefore, based on the relationship represented by the solid line depicted in FIG. 12, the differences DTa' and DTb' in the latent image time between the micro area X0' on the sheet of photographic paper 71 and the micro areas Xa' and Xb' separated away from the front end of the sheet of photographic paper 71 respectively by the distances a and b can be derived.

Figure 13:
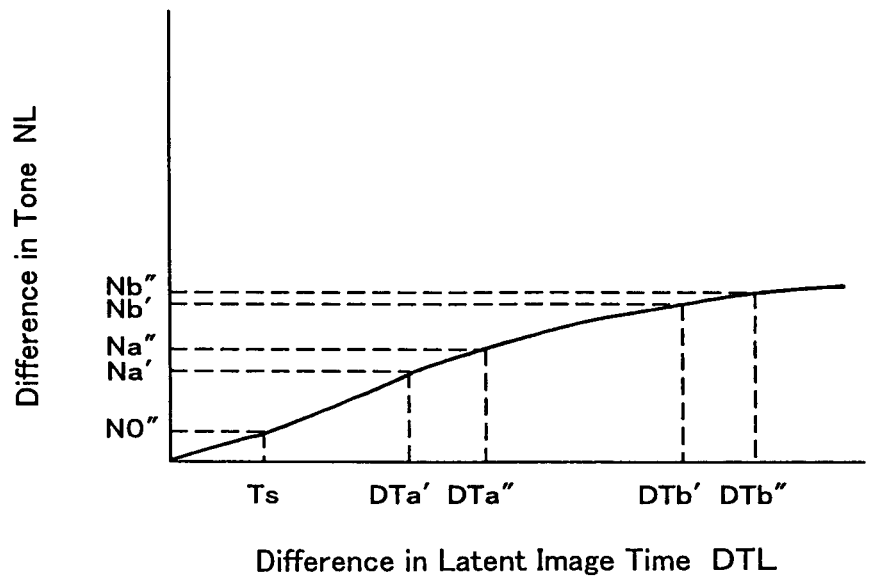
FIG. 13 is a graph showing the relationship between the difference in the latent image time and the difference in tone.

At Step 203, based on the difference DTL in the latent image time derived at Step 202, for the sheet of photographic paper 71 to be applied with the exposure process at the even-numbered turn, the difference NL in tone between an image formed at the micro area X0' and an image formed at the micro area XL is derived for the case where the micro area X0' and the micro area XL are exposed to the same amount of light. FIG. 13 shows the relationship between the difference in the latent image time between the micro area X0' and the micro area XL, and the difference in tone between the image formed at the micro area X0' and the image formed at the micro area XL for the case where the micro area X0' and the micro area XL are exposed to the same amount of light. Therefore, based on FIG. 13, the differences in tone Na and Nb between the image formed at the micro area X0' at the front end of the sheet of photographic paper 71 to be applied with the exposure process at an even-numbered turn, and the images formed at the micro areas Xa' and Xb' that are separated away from the front end by the distance a and b (the differences in the latent image time between the micro area X0' are DTa' and DTb') can be derived.

Next, at Step 204, the length of the sheet of photographic paper 71 to be applied with the exposure process at an odd-numbered turn in the exposure department 30 is checked. In FIG. 11, on the sheet of photographic paper 71, three micro areas X0", Xa" and Xb" are depicted at locations same as the micro areas X0', Xa' and Xb' on the sheet of photographic paper to be applied with the exposure process at an odd-numbered turn.

At Step 205, based on the distance L along the conveying direction from the front end to the micro area XL on the sheet of photographic paper 71 to be applied with the exposure process at an odd-numbered turn, the difference between the latent image time at the micro area XL and the latent image time at the micro area X0' on the sheet of photographic paper 71 to be applied with the exposure process at an even-numbered turn is derived.

Here, there is a proportional relationship represented by the dotted line in FIG. 12 between the distance L from the front end of the sheet of photographic paper 71 to be applied with the exposure process at an odd-numbered turn, and the difference DTL in the latent image time between the micro area X0' on the sheet of photographic paper 71 to be applied with the exposure process at an even-numbered turn and the micro area XL on the sheet of photographic paper 71 to be applied with the exposure process at an odd-numbered turn. The dotted line in FIG. 12 is located at a position to which the position of the solid line depicted for the sheet of photographic paper 71 to be applied with the exposure process at an even-numbered turn in the exposure department 30 is moved upward by the waiting time Ts in the paper assignment department 80. Therefore, based on the relationship represented by the dotted line depicted in FIG. 12, the differences DTa" and DTb" in the latent image time between the micro area X0' on the sheet of photographic paper 71 and the micro areas Xa" and Xb" separated away from the front end of the sheet of photographic paper 71 respectively by the distances a and b can be derived.

At Step 206, based on the difference DTL in the latent image time derived at Step 205, the difference NL in tone between an image formed at the micro area X0' and an image formed at the micro area XL is derived for the case where the micro area XL on the sheet of photographic paper 71 to be applied with the exposure process at an odd-numbered turn is exposed to the same amount of light as that of the micro area X0' on the sheet of photographic paper 71 to be applied with the exposure process at an even-numbered turn. In this case, based on also FIG. 13, the differences No", Na" and Nb" in tone between an image formed at the micro area X0' at the front end of the sheet of photographic paper 71 to be applied with the exposure process at an even-numbered turn, and micro areas X0", Xa" and Xb" separated away from the front end of the sheet of photographic paper 71 to be applied with the exposure process at an odd-numbered turn by the distances 0 (zero), a and b (the differences in the latent image time between the micro area X0' are respectively Ts, DTa" and DTb") can be derived.

Next, at Step 207, based on the difference NL in tone derived at Step 203 and Step 206, for each of the sheets of photographic paper 71 to be applied with the exposure process at an even-numbered turn and an odd-numbered turn in the exposure department 30, correction values ML for the tone is derived for images formed at the micro area XL separated away from the front end of the sheet of photographic paper 71 by the distance L. Table 2 for the sheet of photographic paper 71 to be applied with the exposure process at an even-numbered turn in the exposure department 30, and Table 3 for the sheet of photographic paper 71 to be applied with the exposure process at an odd-numbered turn in the exposure department 30, are correction tables showing the relationship between the distance L from the front end of the sheet of photographic paper 71 and the correction value ML for the tone for the image formed at the micro area XL. The correction value ML shown in Table 2 and Table 3 is a value relative to the tone of the image formed at the micro area X0' on the sheet of photographic paper 71 to be applied with the exposure process at an even-numbered turn in the exposure department 30. In the photograph processing apparatus according to the embodiment, the first LUT storage 22 stores the correction table (Table 2) for the sheet of photographic paper 71 to be applied with the exposure process at an even-numbered turn and the correction table (Table 3) for the sheet of photographic paper 71 to be applied with the exposure process at an odd-numbered turn.

TABLE 2

| Distance L from the Front End | Correction Value ML |
|---|---|
| 0 | M0' (= 0) |
| . | . |
| . | . |
| . | . |
| a | Ma' (= −Na') |
| . | . |
| . | . |
| . | . |
| b | Mb' (= −Nb') |

TABLE 3

| Distance L from the Front End | Correction Value ML |
|---|---|
| 0 | M0" (= −N0") |
| . | . |
| . | . |
| . | . |
| a | Ma" (= −Na") |
| . | . |
| . | . |
| . | . |
| b | Mb" (= −Nb") |

Here, the correction value ML for the tone for the image formed at the micro area XL separated away from the front end of the sheet of photographic paper 71 by the distance L is a value, with an opposite sign, of the difference NL in tone between the image formed at the micro area X0' and the image formed at the micro area XL, and the relationship same as the relationship in the above Eq. 5 is established.

From Table 2, correction values Ma' and Mb' for the tone for the images formed at the micro areas Xa' and Xb' separated away by the distances a and b from the front end of the sheet of photographic paper 71 to be applied with the exposure process at an even-numbered turn in the exposure department 30 can be derived. The correction value M0' for the image formed at the micro area X0 on the sheet of photographic paper 71 to be applied with the exposure process at an even-numbered turn in the exposure department 30 is zero.

From Table 3, correction values Ma" and Mb" for the tone for the images formed at the micro areas Xa" and Xb" separated away by the distances a and b from the front end of the sheet of photographic paper 71 to be applied with the exposure process at an odd-numbered turn in the exposure department 30 can be derived. The correction value M0" for the image formed at the micro area X0" on the sheet of photographic paper 71 to be applied with the exposure process at an odd-numbered turn in the exposure department 30 is the difference N0" with the opposite sign in tone corresponding to the case where the difference DTL in the latent image time is the waiting time TS in FIG. 13.

Figure 14:
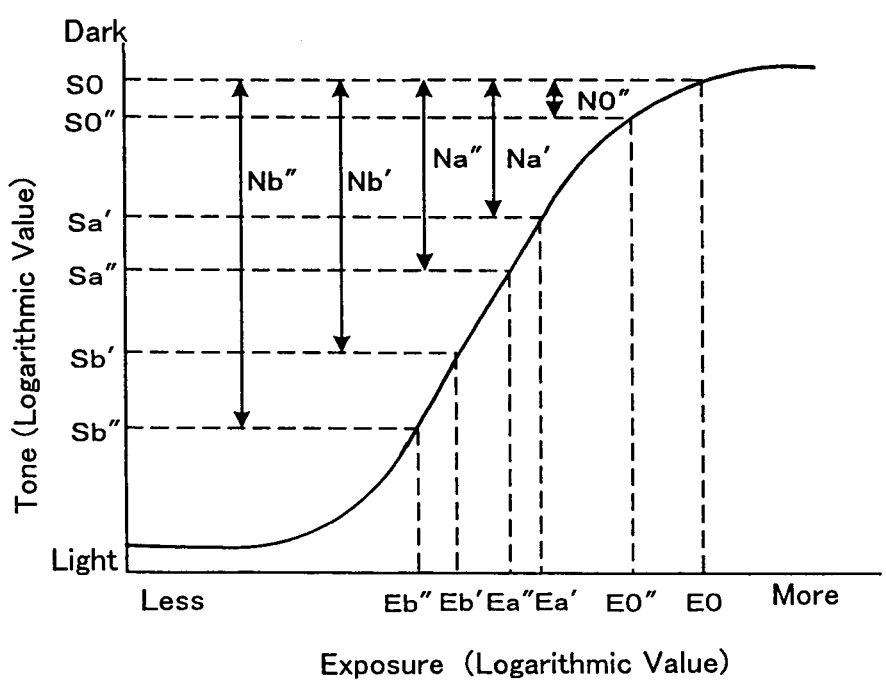
FIG. 14 is a graph showing a coloring characteristic of the sheet of photographic paper in the second embodiment of the present invention.

Next, at Step 208, based on the correction value ML for the tone derived at Step 207 and the coloring characteristic of the photographic paper 71, the exposure of each of the micro areas XL on the sheets of photographic paper 71 to be applied with the exposure process at an odd-numbered turn and an even-numbered turn is derived. FIG. 14 is a graph showing an example of the coloring characteristic of the photographic paper 71 when the latent image time is T0'. In FIG. 14, the axis of abscissa represents the exposure and the axis of ordinate represents the tone.

Here, similarly to the first embodiment, the case is considered, where the pixel levels of the pixels corresponding to the micro areas X0', Xa' and Xb' in image data and the pixel levels of the pixels corresponding to the micro areas X0", Xa" and Xb" in the image data are all correspond to the tone S0 will be considered. Without considering the difference in tone caused by the difference in the latent image time among the micro areas, these micro areas X0', Xa', Xb', X0", Xa" and Xb" may be all exposed with the exposure E0. However, considering the difference in tone caused by the difference in the latent image time for these micro areas, the exposures of the micro areas X0', Xa', Xb', X0", Xa" and Xb" need to be adjusted as follows.

The correction value for the tone for the image formed at the micro area X0' on the sheet of photographic paper 71 to applied with the exposure process at an even-numbered turn is derived as the correction value M0' from the correction table in Table 2. Therefore, the exposure of the micro area X0" need to be adjusted to an exposure smaller than the exposure E0 by the amount corresponding to the correction value M0'. Here, because the correction value M0' is zero from Eq. 5, the exposure of the micro area X0' on the sheet of photographic paper 71 does not need to be adjusted and the exposure of the micro area X0' is derived as E0.

Because the correction value for the tone for the image formed at the micro area Xa' is derived from the correction table in Table 2 as the correction value Ma', the exposure needs to be adjusted to an exposure smaller than the exposure E0 by the exposure corresponding to the corrective amount Ma'. Here, because the correction value Ma' is equal to −Na' from Eq. 5, the exposure of the micro area Xa' is, as shown in FIG. 14, derived as Ea' corresponding to a tone Sa' that is lighter than the tone S0 by the difference Na' in tone. Similarly, the exposure of the micro area Xb' is derived as Eb'.

The correction value for the tone for an image formed at the micro area X0" on the sheet of photographic paper 71 to be applied with the exposure process at an odd-numbered turn is derived as the correction value M0" from the correction table in Table 3. Therefore, the exposure of the micro area X0" needs to be adjusted to an exposure smaller than the exposure E0 by an exposure corresponding to the correction value M0". Here, because the correction value M0" is equal to −N0" from Eq. 5, the exposure of the micro area Xa" is, as shown in FIG. 14, derived as E0" corresponding to a tone S0" that is lighter than the tone S0 by the difference N0" in tone. Similarly, the exposure of the micro area Xa" and Xb" are derived respectively as Ea" and Eb".

For facilitation of understanding of the description, the case where the pixel levels of the pixels corresponding to the six micro areas X0', Xa', Xb', X0", Xa" and Xb" in the image data has been described. However, the exposures of the these micro areas can be respectively derived in the same manner for the case where the pixel levels of the six micro areas X0', Xa', Xb', X0", Xa" and Xb" differ from each other. That is, the exposure of the micro areas Xa', Xb', X0", Xa" and Xb" derived in this case are respectively exposures corresponding to tones lighter than the tones corresponding to the pixel levels of the pixels corresponding to the micro areas Xa', Xb', X0", Xa" and Xb" by correction values Ma', Mb', M0", Ma" and Mb".

Finally, at Step 209, each micro area XL on the sheet of photographic paper 71 is exposed with the exposure derived at Step 208. There is almost no difference in tone caused by the difference in the latent image time originated by whether there is the waiting time for the sheet of photographic paper 71 in the paper assignment department 80 and the difference in the distance from the front end of the sheet of photographic paper 71 in the images formed at the micro areas X0', Xa', Xb', X0", Xa" and Xb" on the sheet of photographic paper 71 exposed in this manner.

As described above, according to the photograph processing apparatus of the embodiment, a high-quality image without any tone unevenness caused by the difference in the latent image time can be formed on one sheet of photographic paper 71 as well as high-quality images without any tone unevenness caused by the difference in the latent image time can be formed on a sheet of photographic paper 71 to be applied with the exposure process at an even-numbered turn and on a sheet of photographic paper 71 to be applied with the exposure process at an odd-numbered turn, for which the latent image times are different among the micro areas separated by the same distance from the front end.

Next, modifications of the above-described embodiment will be described. In the above-described first embodiment, the micro area X0 at the front end of the sheet of photographic paper 71 is used as a reference area for the tone. However, a micro area at another location may be used as the reference area. Also, in the second embodiment, a micro area located at a position other than the front end of the sheet of photographic paper 71 to be applied with the exposure process at an even-numbered turn (including the micro areas on the sheet of photographic paper 71 to be applied with the exposure process at an odd-numbered turn) may be used as the reference area. Furthermore, though the above-described two embodiments are adapted to correct the exposure such that there is no difference in tone between images caused by the difference in the latent image time, the present invention includes not only those that are adapted to correct the exposure such that the difference in tone between images caused by the difference in the latent image time is completely removed but also those that are adapted to correct the exposure such that the above difference in tone simply becomes small.

Furthermore, in the first embodiment, the case where the latent image times for the micro areas on the sheet of photographic paper 71 are not same because the distances from the front end of the sheet of photographic paper 71 are different is described and, in the second embodiment, the case where the latent image times for the micro areas on the sheet of photographic paper 71 are not same because the distances from the front end of the sheet of photographic paper 71 are different and the conveying paths for the sheet of photographic paper 71 are different is described, however, the present invention can be applied to the case where the latent image times for the micro areas on the sheet of photographic paper 71 are different for another reason.

In addition, the first and the second embodiments take the example of the photographic paper 71 on which the tone of an image becomes darker as the latent image time of the image becomes longer. However, on the contrary, the present invention can be applied to photographic paper 71 on which the tone of an image formed on the photographic paper 71 becomes lighter as the latent image time becomes longer.

In the first and the second embodiments, the case where the conveying speed V1 for the sheet of photographic paper 71 in the exposure department 30 is higher than the conveying speed V2 for the sheet of photographic paper 71 in the development department 40 has been described. However, the present invention can be applied to the case where the conveying speed V1 for the sheet of photographic paper 71 in the exposure department 30 is lower than the conveying speed V2 for the sheet of photographic paper 71 in the development department 40.

Furthermore, as in the above first embodiment, in the case where the sheets of photographic paper 71 are conveyed in a line in both of the exposure department 30 and the development department 40, when the difference in the latent image time is generated by the order of the sheet of photographic paper 71 conveyed, the exposure may be corrected such that there is no difference in tone between images formed on sheets of photographic paper 71 that are different from each other.

The photograph forming apparatus of the present invention does not need to have the first LUT storage 22. In this case, the contents same as the contents of the graphs shown in FIG. 5 and FIG. 6 may be stored instead of the LUT, In the second embodiment, the case where the plurality of photographic paper 71 are conveyed in a line in the exposure department 30 and are conveyed in two lines in the development department 40 has been described. However, the plurality of photographic paper 71 may be conveyed in a line in the exposure department 30 and be conveyed in three or more lines in the development department 40.

While this invention has been described in conjunction with the specific embodiments outlined above, it is evident that many alternatives, modifications and variations will be apparent to those skilled in the art. Accordingly, the preferred embodiments of the invention as set forth hereinabove are intended to be illustrative only, not limiting. Various changes may be made without departing from the spirit and scope of the invention as defined in the following claims.

What is claimed is:

1. An image forming apparatus comprising:
   an exposure department for exposing a photosensitive member conveyed at a first conveying speed;
   a development department for developing the photosensitive member, conveyed at a second conveying speed different from the first conveying speed, after being exposed in the exposure department; and
   a controller for controlling the exposure of the photosensitive member in the exposure department such that, when pixel levels in image data corresponding to a first area and a second area along a conveying direction of the photosensitive member are identical where the first area and the second area being different from each other, the difference in tone, caused by the difference in latent image time between the first area and the second area, between images formed respectively at the first area and the second area is smaller than that in the case where the first area and the second area are exposed to the same amount of light.

2. The image forming apparatus according to claim 1, wherein the controller comprises a storage that stores a correction table indicating the relationship between the distance along the conveying direction between the first area and the second area and correction values relative to the tone of the images.

3. The image forming apparatus according to claim 1, wherein the controller controls the exposure of the photosensitive member in the exposure department such that there is no difference in tone between the images formed respectively at the first area and the second area when the two pixel levels in the image data corresponding to the first area and the second area are identical.

4. An image forming apparatus comprising:
   an exposure department for exposing a first and a second photosensitive members conveyed in series at a first conveying speed;
   a development department for developing the first and the second photosensitive members conveyed in parallel at a second conveying speed different from the first conveying speed, after being exposed in the exposure department; and
   a controller for controlling the exposure of the first and the second photosensitive members in the exposure department such that, (a) when pixel levels in image data corresponding to a first area and a second area along a conveying direction of the first photosensitive member are identical where the first area and the second area being different from each other, the difference in tone, caused by the difference in the latent image time between the first area and the second area, between images formed respectively at the first area and the second area is smaller than that in the case where the first area and the second area are exposed to the same amount of light, (b) when pixel levels in image data corresponding to the first area on the first photosensitive member and a third area on the second photosensitive member are identical, the difference in tone, caused by the difference in the latent image time between the first area and the third area, between images formed respectively at the first area and the third area is smaller than that in the case where the first area and the third area are exposed to the same amount of light, and (c) when pixel levels in image data corresponding to the third area and a fourth area along the conveying direction of the second photosensitive member are identical where the third area and the fourth area being different from each other, the difference in tone, caused by the difference in the latent image time between the third area and the fourth area, between images formed respectively at the third area and the fourth area is smaller than that in the case where the third area and the fourth area are exposed to the same amount of light.

5. The image forming apparatus according to claim 4, wherein the controller comprises a storage that stores:
   a first correction table indicating the relationship between the distance along the conveying direction between the first area and the second area and correction values relative to the tone of the images; and
   a second correction table indicating the relationship between the distance along the conveying direction between the third area and the fourth area and correction values relative to the tone of the images.

6. The image forming apparatus according to claim 4, further comprising:

an assignment department arranged between the exposure department and the development department, the assignment department receiving a plurality of photosensitive members supplied in series one after another from the exposure department and supplying the plurality of photosensitive members to the development department in parallel, wherein the first photosensitive member and the second photosensitive member are supplied at the same time in parallel from the assignment department to the development department.

7. The image forming apparatus according to claim 4, wherein the controller controls the exposure of the first photosensitive member and the second photosensitive member in the exposure department such that there is no difference in tone between images formed respectively at the first through fourth areas when four pixel levels in image data corresponding to the first through fourth areas are identical.

8. An image forming apparatus comprising:

an exposure department for exposing a photosensitive member conveyed at a first conveying speed;

a development department for developing the photosensitive member, conveyed at a second conveying speed after being exposed in the exposure department;

a tone difference characteristics storage that stores a relationship between the distance along the conveying direction from a reference area to a micro area being a target of exposure correction on the photosensitive member, and the difference in tone between images formed respectively at the reference area and the micro area when the reference area and the micro area are exposed to the same amount of light in the exposure department;

a coloring characteristic storage that stores the relationship between the exposure of the photosensitive member and the tone of the image at the reference area; and an exposure derivation unit that derives an exposure of the micro area in the exposure department based on the relationship between the exposure and the tone stored in the coloring characteristic storage and the relationship between the distance and the difference in tone stored in the tone difference characteristics storage such that images with the same tone are formed at the micro area and the reference area when pixel levels in image data corresponding to the reference area and the micro area are the same.

9. An image forming apparatus comprising:

an exposure department for exposing a first and a second photosensitive members conveyed in series at a first conveying speed;

a development department for developing the first and the second photosensitive members conveyed in parallel at a second conveying speed after being exposed in the exposure department;

a first tone difference characteristics storage that stores a relationship between the distance along the conveying direction from a reference area to a first micro area being the target of exposure correction on the first photosensitive member, and the difference in tone between images formed respectively at the reference area and the first micro area when the reference area and the first micro area are exposed to the same amount of light in the exposure department;

a second tone difference characteristics storage that stores a relationship between the distance along the conveying direction from a second micro area to a third micro area on the second photosensitive member, and the difference in tone between images formed respectively at the reference area, the second micro area and the third micro area when the reference area, the second micro area and the third micro area are exposed to the same amount of light in the exposure department;

a coloring characteristic storage that stores the relationship between the exposure of the photosensitive member and the tone of the image at the reference area; and an exposure derivation unit that derives an exposures of the first through third micro areas in the exposure department based on the relationship between the exposure and the tone stored in the coloring characteristic storage and the relationship between the distance and the difference in tone stored in the first and the second tone difference characteristics storages such that images with the same tone are formed at the first through third micro areas and the reference area when pixel levels in image data corresponding to the reference area and the first through third micro areas are the same.

* * * * *